United States Patent [19]

Sakaguchi et al.

[11] Patent Number: 5,303,223
[45] Date of Patent: Apr. 12, 1994

[54] HEAD CARRIAGE APPARATUS MOVED BY A LEAD-SCREW SHAFT INCLUDING RESILIENT MEANS FOR PRESSING THE LEAD-SCREW SHAFT IN A SLANTING DIRECTION TOWARD THE HEAD CARRIAGE

[75] Inventors: Takahiro Sakaguchi, Kodaira; Daihachiro Takasu, Niiza; Yasuhiko Ando, Tachikawa; Kazuo Yokota; Hiroshi Tsuyuguchi, both of Tokyo, all of Japan

[73] Assignee: Teac Corporation, Tokyo, Japan

[21] Appl. No.: 802,146

[22] Filed: Dec. 3, 1991

[30] Foreign Application Priority Data

Dec. 5, 1990 [JP] Japan ............................. 2-400522

[51] Int. Cl.$^5$ ..................... G11B 5/55; G11B 21/08
[52] U.S. Cl. ................................. 369/215; 360/106
[58] Field of Search ............. 369/215, 223; 360/106, 360/109

[56] References Cited

U.S. PATENT DOCUMENTS

| | | | |
|---|---|---|---|
| 2,970,841 | 2/1961 | Lorenz | 369/223 |
| 4,131,923 | 12/1978 | Wachs et al. | 360/106 |
| 4,750,068 | 6/1988 | Akasaki et al. | 360/106 |
| 4,783,708 | 11/1988 | Hasegawa | 360/106 |
| 4,835,646 | 5/1989 | Kurosawa et al. | 360/109 |
| 5,155,718 | 10/1992 | Hashimoto et al. | 369/44.32 |

Primary Examiner—Stuart S. Levy
Assistant Examiner—Kevin M. Watkins
Attorney, Agent, or Firm—Michael N. Meller

[57] ABSTRACT

A head carriage apparatus includes a head carriage including a head being placed onto a disk for recording and reproducing information on the disk and having an extension and a connecting portion formed on the extension integrally with the head carriage, a lead-screw shaft having a lead screw in which a thread ridge and a thread groove are formed, the connecting portion being fitted in the thread groove of the lead screw, a drive part for driving and rotating the lead-screw shaft so that the head carriage is moved in a radial direction of the disk parallel to an axial direction of the lead-screw shaft, a guide shaft for guiding movement of the head carriage in a direction parallel to the radial direction of the disk, the head carriage being supported by the guide shaft at two supporting positions being located apart from each other in axial direction of the guide shaft, and a resilient part for pressing the lead-screw shaft in a direction facing the head carriage, the resilient part being fixed at one end onto the head carriage, the other end of the resilient part being brought into contact with the lead-screw shaft at a position corresponding with respect to the axial direction of the lead-screw shaft to a position at which the connecting portion is fitted in the thread groove of the lead-screw shaft. One of the two supporting points of the guide shaft is displaced to a forwardly moved point in order to downsize a disk drive unit in which the head carriage apparatus is accommodated.

4 Claims, 10 Drawing Sheets

HEAD CARRIAGE APPARATUS MOVED BY A LEAD-SCREW SHAFT INCLUDING RESILIENT MEANS FOR PRESSING THE LEAD-SCREW SHAFT IN A SLANTING DIRECTION TOWARD THE HEAD CARRIAGE

BACKGROUND OF THE INVENTION

The present invention generally relates to a head carriage apparatus, and more particularly to a head carriage apparatus in which a head carriage is driven and moved by rotation of a lead-screw shaft and the movement of the head carriage is guided by a guide shaft.

A head carriage in a head carriage apparatus is driven and moved by rotation of a lead-screw shaft for recording and reproducing information on a disk by mans of a head carried by the head carriage. A description of this head carriage apparatus will be given by referring to FIGS. 1 and 2. In FIG. 1, a head carriage apparatus 1 includes a head carriage 10 carrying a head 11, a guide shaft 5 for guiding movement of the head carriage 10 in a direction as indicated by an arrow X1 or X2 in FIG. 1, and a drive part 4 having a lead-screw shaft 2 which is coupled to the head carriage 10 and a stepping motor 3 which rotates the lead-screw shaft 2 so as to move the head carriage 10 in the direction as indicated by the arrow X1 or X2 in FIG. 1. The guide shaft 5 is fixed to a disk unit (not shown) which is provided separately from the head carriage 10. The lead-screw shaft 2 is threaded so as to form a lead screw including a thread ridge 2b and a thread groove 2a on the threaded part of the lead-screw shaft 2.

This head carriage 10 has a carriage body 15 which is provided with an extension 12 extending transversely from a left-hand rear end of the carriage body 15 so that the extension 12 is brought in contact with a top of the lead-screw shaft 2, as shown in FIG. 2. This extension 12 is formed integrally with the head carriage 10 through a molding process of synthetic resin, and includes a downwardly projecting connecting portion 13 on bottom of the extension 12. The connecting portion 13 is fitted in the thread groove 2a of the lead-screw shaft 2 so as to apply a drive force from the thread ridge 2b to the connecting portion 13 of the carriage body 15 in a direction perpendicular to a flank of the threaded part of the lead-screw shaft 2 when the lead-screw shaft 2 is rotated. The axial direction of the lead-screw shaft 2 substantially accords with the direction as indicated by the arrow X1 or X2 in FIG. 1.

The carriage body 15 of the head carriage lo is provided on the opposite side (the right-hand side thereof) with a guide portion 16 extending longitudinally in parallel to the direction as indicated by the arrow X1 or X2 in FIG. 1, and this guide portion 16 is inserted into and guided by the guide shaft 5 in the axial direction of the guide shaft 5. Therefore, the head carriage 10 is moved in the direction as indicated by the arrow X1 or X2 in FIG. 1, by the above drive force exerted by the lead-screw shaft 2 when the shaft 2 is rotated.

The above movement of the head carriage 10 in the direction as indicated by the arrow X1 or X2 is guided by the guide shaft 5 and supported at two supporting portions 16a and 16b of the guide portion 16. In order to stabilize this movement of the head carriage 10 in the direction as indicated by the arrow X1 or X2 in FIG. 1, the supporting portions 16a and 16b of the guide portion 16 are arranged apart from each other by an appropriate distance Lab which is large enough for stable movement of the head carriage 10. An intermediate portion of the guide portion 16 between the supporting portions 16a and 16b is formed into a hollow part.

As apparent in from FIG. 2, the head carriage 10 is provided with a leaf spring 14 on the bottom of the carriage body 15, and this leaf spring 14 is fixed at one end portion thereof to the carriage body 15 by means of a machine screw 17. The other end of the leaf spring 14 is a free end and the leaf spring 14 at this free end is brought into contact with an outer peripheral surface of the lead-screw shaft 2. The leaf spring 14 serves to apply an upwardly biasing force to the lead-screw shaft 2 against the extension 12 of the carriage body 15. In accordance with the upwardly biasing force by the leaf spring 14, a downward force from the connecting portion 13 is exerted onto the lead-screw shaft 2 against the leaf spring 14, thus preventing the connecting portion 13 from being easily separated from the thread groove 2a of the lead-screw shaft 2. As described above, the head carriage 10 of the conventional apparatus is supported by the guide shaft 5 at two supporting points A and B, corresponding to the supporting portions 16a and 16b of the guide portion 16, and also supported by the lead-screw shaft 2 at a supporting point C, corresponding to the connecting portion 13 of the carriage body 15.

Recently, downsizing a disk drive unit in which the above described head carriage apparatus is accommodated is becoming important for a manufacturer of disk drive products. One attempt to downsize a disk drive unit can be made by changing the relative position of a connector 13 in the disk drive unit, as shown in FIG. 3A, into a position, as shown in FIG. 3B. For this purpose the relative position of the guide portion 16 provided within the head carriage apparatus must be changed or displaced into the relative position shown in FIG. 3B. In the head carriage apparatus shown in FIG. 3B, the supporting point B of the guide portion 16 is moved to a position which is located on the same side as the supporting point A with respect to a line D passing through the supporting point C and being perpendicular to the axial line of the guide shaft 5. On the other hand, in the head carriage apparatus shown in FIG. 3A, the supporting point B is located on the side opposite to the supporting point A with respect to the perpendicular line D.

In the case in which the supporting point B of the guide portion of the head carriage is simply moved in a forward direction to the position, as shown in FIG. 3B, for downsizing the disk drive unit, there is a problem in that the head carriage is slightly rotated around an axis perpendicular to the horizontal plane of the head carriage and the head is erroneously placed at a position deviating from an intended accurate position relative to the disk. This may cause a malfunction to occur in the disk recording and reproducing performed by the disk drive unit.

SUMMARY OF THE INVENTION

Accordingly, it is a general object of the present invention to provide an improved head carriage apparatus in which the above described problems are eliminated.

Another and more specific object of the present invention is to provide a head carriage apparatus which achieves stable movement of the head carriage by reducing an undesired rotating force acting on the head carriage, and allows accurate positioning of the head on the disk in the proper direction, when the supporting point of the head carriage is modified in order to downsize a disk drive unit in which the head carriage apparatus is accommodated. The above mentioned objects of the present invention can be achieved by a head carriage apparatus which comprises a head carriage including a head being placed onto a disk for recording and reproducing information on the disk and having an extension extending externally from an end portion of the head carriage and a connecting portion formed on the extension integrally with the head carriage. A lead-screw shaft is coupled to the head carriage and has a lead screw in which a thread ridge and a thread groove are formed, the connecting portion being fitted in the thread groove of the lead screw; A drive part is provided for driving and rotating the lead-screw shaft, the head carriage being moved in a radial direction of the disk, parallel to an axial direction of the lead-screw shaft, by rotation of the lead-screw shaft rotated by the drive part. Also provided is a guide shaft for guiding movement of the head carriage in a direction parallel to the radial direction of the disk, the head carriage being supported by the guide shaft at two supporting positions of the guide shaft being located apart from each other in axial direction of the guide shaft. A resilient part presses the lead-screw shaft in a direction facing the head carriage, the resilient part being fixed at one end onto the head carriage, and the other end of the resilient part being brought into contact with an outer peripheral surface of the lead-screw shaft at a position of the lead-screw shaft, the position corresponding, with respect to the axial direction of the lead-screw shaft, to a position at which the connecting portion of the head carriage is fitted in the thread groove of the lead-screw shaft. According to the present invention, it is possible to achieve stable movement of the head carriage in accurate direction so that the disk drive unit performs correctly recording and reproducing information on the disk, when the supporting point of the guide portion is changed in a forward direction into the position as shown in FIG. 3B for downsizing the disk drive unit.

Other objects and further features of the present invention will become more apparent from the following detailed description when read in conjunction with the accompanying drawings.

DESCRIPTION OF THE PREFERRED EMBODIMENT

Figure 3A:
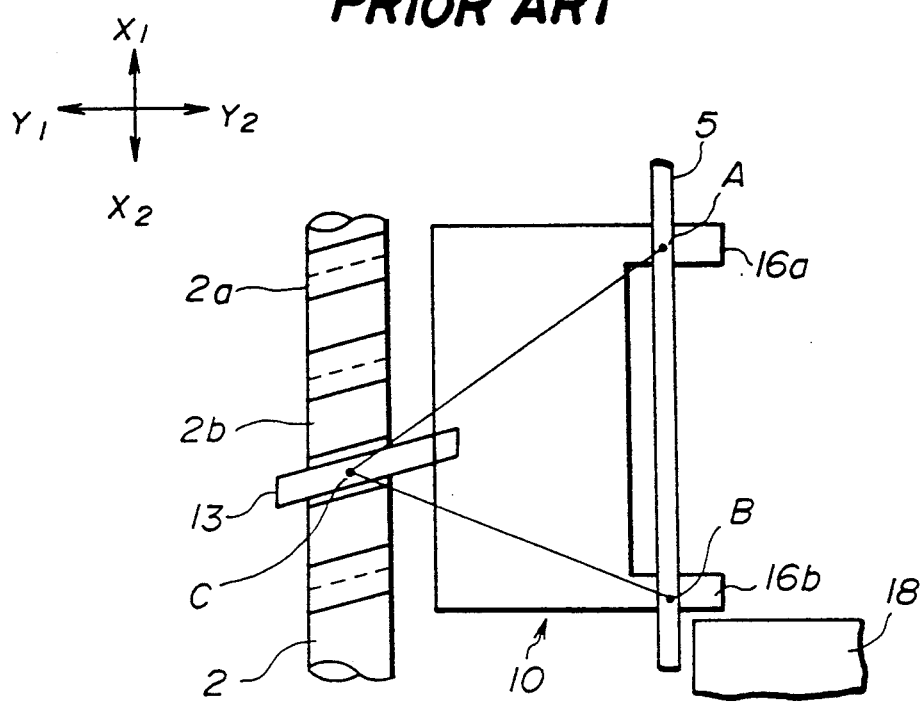
FIGS. 3A and 3B are diagrams showing supporting points at which a head carriage apparatus is supported by a guide shaft, one supporting point being changed from a position shown in FIG. 3A to a position shown in FIG. 3B.
Figure 3B:
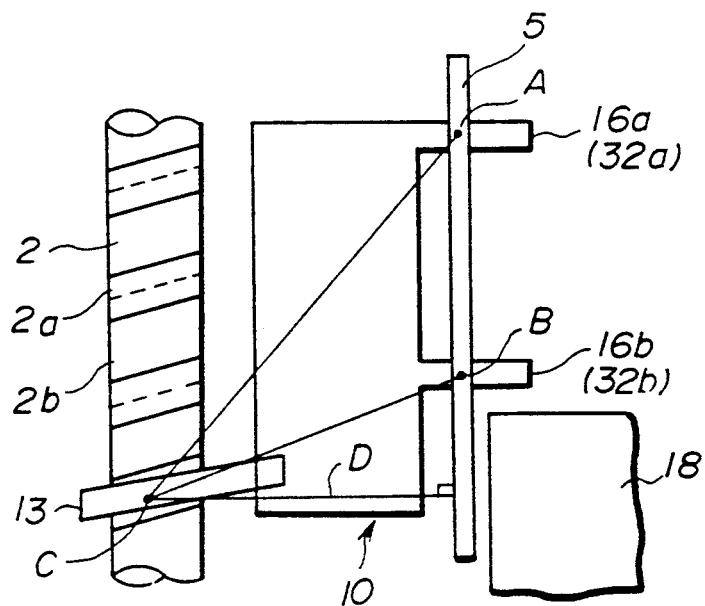

First, a detailed description will be given of the head carriage apparatus in which the supporting point B of the guide portion 16 is displaced in forward direction to the position shown in FIG. 3B, with reference to FIGS. 4 and 5.

Figure 4:
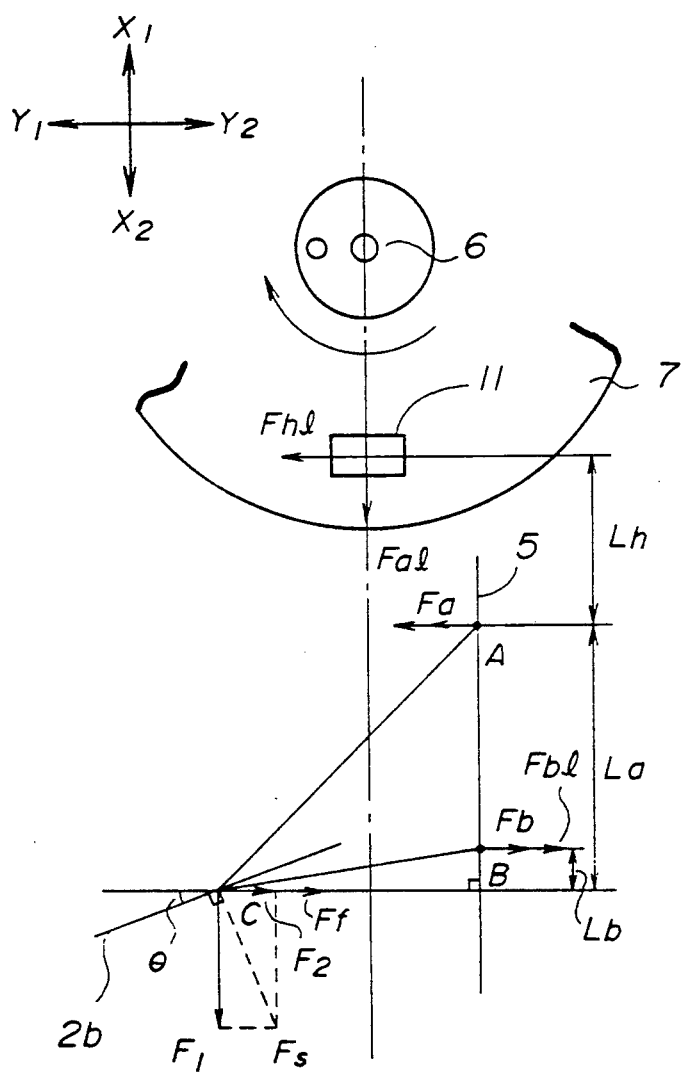
FIG. 4 is a diagram for explaining the effects of forces acting on the head carriage apparatus shown in FIG. 3B when the head carriage is moving away from a fixed spindle shaft around which a disk is rotated.

FIG. 4 shows schematically forces acting on the supporting points A, B and C of the head carriage 10 when the head 11 is moving in the direction, as indicated by the arrow X2 in FIG. 4, away from a fixed spindle shaft 6 around which a disk 7 is rotated. When the lead-screw shaft 2 is rotated in a direction as indicated by an arrow E1 in FIG. 2, a force Fs is exerted from the thread ridge 2b of the lead-screw shaft 2 onto the connecting portion 13 (at the supporting point C) of the head carriage 10, in a direction perpendicular to an inclined thread surface of the lead-screw shaft 2. This inclination angle is indicated by a lead angle $\theta$ in FIG. 4. The force Fs is decomposed into two component forces F1 and F2 as shown in FIG. 4, the force F1 acting to move the head carriage 10 in the direction X2 parallel to the axial direction of the lead-screw shaft 2, and the force F2 ($=$F1 tan $\theta$) acting on the lead-screw shaft 2 in the direction Y2 perpendicular to the axial direction of the lead-screw shaft 2.

Apart from the force Fs described above, a force Ff occurs, due to friction between the lead-screw shaft 2 and the connecting portion 13, at the supporting point C in the direction Y2. In this respect, it is assumed that a frictional force between the lead-screw shaft 2 and the leaf spring 14 is much smaller than the above frictional force Ff and this frictional force is disregarded. Thus, a force represented by (F2+Ff) is acting at the supporting point C in the direction Y2. Also, it is assumed that the connecting portion 13 and the guide shaft 5 are on the same plane. Due to the combined force (F2+Ff) acting on the shaft 2 at the supporting point C in the direction Y2, a pair of forces Fa and Fb act at the supporting point A in the direction Y1 and the supporting point B in the direction Y2, respectively. These forces Fa and Fb are represented by the following formulas.

$Fa = (F2 + Ff) \times Lb / (La - Lb)$      Direction Y1

$Fb = (F2 + Ff) \times La / (La - Lb)$      Direction Y2

In the above formulas, La and Lb denote constant distances relating to the supporting points A and B as shown in FIG. 4. In addition, a head load force Fhl acts on the head 11 in a circumferential direction of the disk 7 (which is parallel to the direction Y1) when the disk 7 which is rotating around the shaft 6 slides on the head 11. Due to the head load force Fhl acting on the head 11, a pair of forces Fal and Fbl act on the head carriage 10 carrying the head 11, the force Fal acting at the supporting point A of the head carriage 10 in the direction Y1 and the force Fbl acting at the supporting point B in the direction Y2. These forces Fal and Fbl are represented by the following formulas.

$$Fal = Fhl \times (Lh + La) / La \qquad \text{Direction Y1}$$

$$Fbl = Fhl \times Lh / (La - Lb) \qquad \text{Direction Y2}$$

In the above formulas, Lh denotes a constant distance between the supporting point A and the center of the head 11, as shown in FIG. 4.

Accordingly, in the case of the head carriage 10 in which the supporting point B is located on the same side as the supporting point A with respect to the perpendicular line D, the pair of forces Fal and Fbl acting at the points A and B, due to the head load force, are added to the pair of forces Fa and Fb acting at the points A and B. Thus a greater rotating force is produced to rotate slightly the head carriage 10 counterclockwise around an axis perpendicular to the horizontal plane of the head carriage 10. Therefore, in this case, there is a problem in that the head carriage 10 is slightly rotated and the head 11 is erroneously placed at a position deviating from an intended accurate position relative to the disk. This may cause a malfunction of disk recording and reproducing performed by the disk drive unit.

Figure 5:
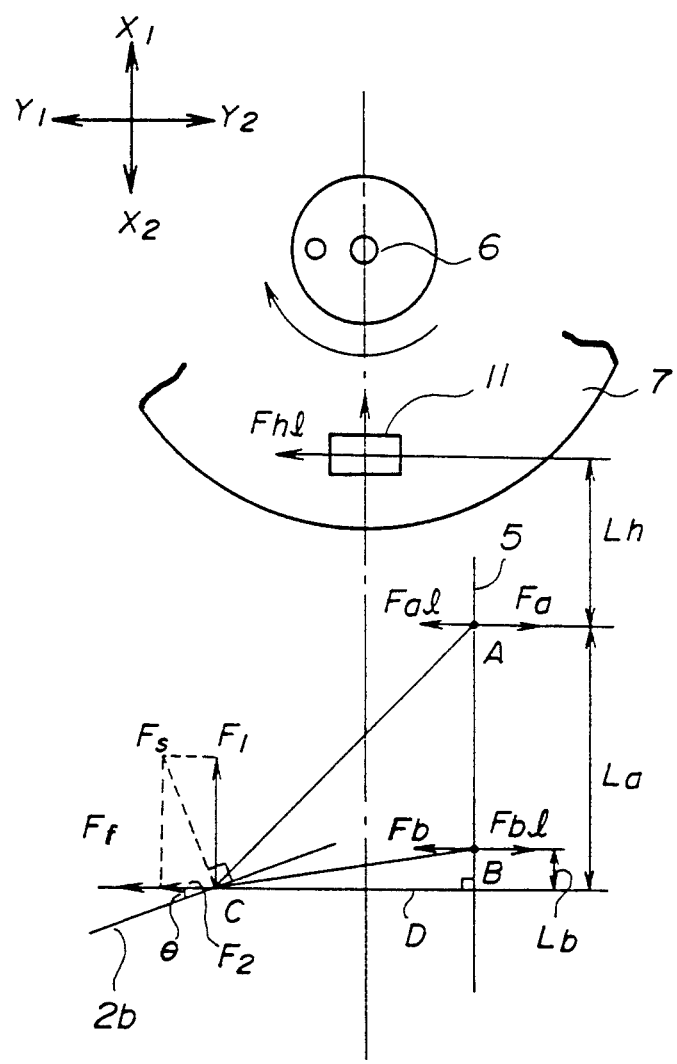
FIG. 5 is a diagram for explaining the effects of forces acting on the head carriage apparatus shown in FIG. 3B when the head carriage is approaching the spindle shaft around which the disk is rotated.

FIG. 5 shows schematically forces acting on the supporting points A, B and C of the head carriage 10 when the head 11 is approaching the fixed shaft 6 around which the disk 7 is rotated. This movement of the head 11 is made by rotating the lead-screw shaft 2 in a direction as indicated by an arrow E2 in FIG. 2 so as to move the head carriage 10 in the direction X1. In this case, the above mentioned force Fs is exerted from the lead-screw shaft 2 onto the connecting portion 13 (at the supporting point C) of the head carriage 10 in the opposite direction. This force Fs, as shown in FIG. 5, is acting at the supporting point C in the direction opposite to the direction in the above case as shown in FIG. 4. This force Fs is decomposed into two component forces F1 and F2, the force F1 acting at the supporting point C to move the head carriage 10 in the direction X1 parallel to the axial direction of the lead-screw shaft 2, and the force F2 ($=F1 \tan \theta$) acting at the supporting point C in the direction Y1 perpendicular to the axial direction of the lead-screw shaft 2.

Similarly, a frictional force Ff occurs, due to friction between the lead-screw shaft 2 and the connecting portion 13, at the supporting point C in the direction Y1 which is opposite to that in the previous case. Thus, a force represented by (F2+Ff) is acting at the supporting point C in the direction Y1. Due to the force (F2+Ff) acting on the shaft 2 at the supporting point C in the direction Y1, a pair of forces Fa and Fb act at the supporting point A in the direction Y2 and the supporting point B in the direction Y1, respectively, which directions are opposite to those corresponding directions in the previous case shown in FIG. 4. In addition, a head load force Fhl takes place to act on the head 11 in a circumferential direction of the disk 7 when the disk 7 which is rotating around the shaft 6 slides on the head 11. This direction is parallel to the direction Y1 and is the same as in the case shown in FIG. 4. Due to the head load force Fhl acting on the head 11, a pair of forces Fal and Fbl act on the head carriage 10, the force Fal acting at the supporting point A in the direction Y1 and the force Fbl acting at the supporting point B in the direction Y2. These directions are the same as in the previous case shown in FIG. 4.

Accordingly, in the case of the head carriage 1 shown in FIG. 5, the forces Fal and Fbl acting at the points A and B, due to the head load force Fhl, serve to counteract the effects of the forces Fa and Fb being exerted at the same points by the lead-screw shaft 2. However, in general, the forces Fal and Fbl due to the head load force Fhl are greater than the forces Fa and Fb exerted by the lead-screw shaft 2. Thus, the forces Fal and Fbl are only attenuated by the forces Fa and Fb, and, in this case, the head carriage 10 is also slightly rotated counterclockwise around the axis perpendicular to the horizontal plane of the head carriage 10 by an attenuated rotating force. Hence, when the head 11 is approaching the shaft 7, there is also a problem in that the head carriage 10 is slightly rotated and the head 11 is erroneously placed at a position deviating from an intended accurate position relative to the disk 7. This may cause a malfunction of disk recording and reproducing performed by the disk drive unit.

Figure 2:
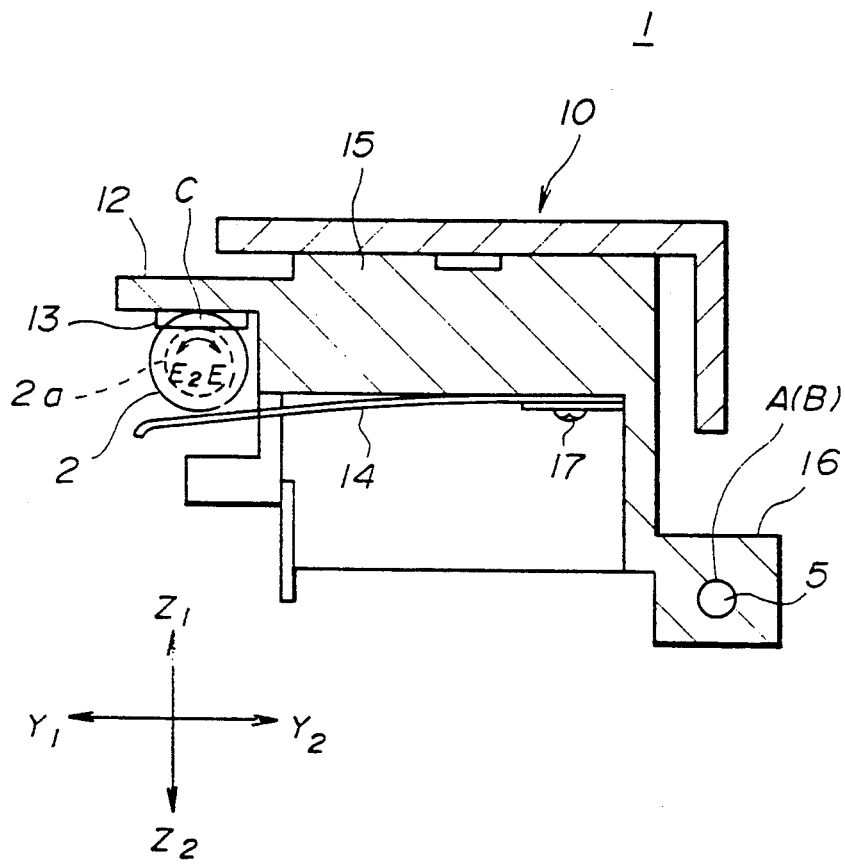
FIG. 2 is a sectional view showing the head carriage apparatus as shown in FIG. 1 which is taken along a line II—II in FIG. 1.
Figure 6:
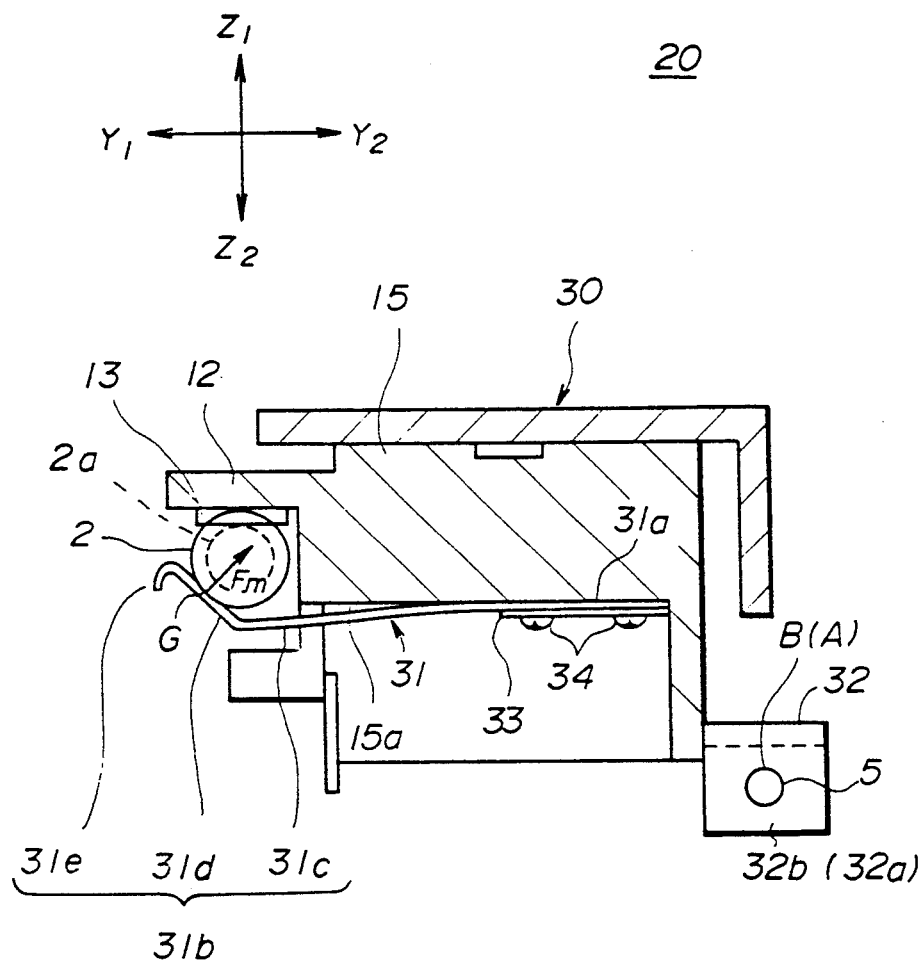
FIG. 6 is a sectional view showing a head carriage apparatus to which the present invention is applied.

Next, a description will be given of a head carriage apparatus to which the present invention is applied, by referring to FIG. 6. In FIG. 6, those parts which are the same as those corresponding parts shown in FIG. 2 are designated by the same reference numerals, and a description thereof will be omitted.

The head carriage apparatus 20 shown in FIG. 6 includes a head carriage 30 which has a leaf spring 31, which is the resilient part of the invention, provided on bottom of the head carriage 30 and a guide portion 32 provided on a side of the head carriage 30. Similar to the apparatus shown in FIG. 2, the head carriage 30 includes the carriage body 15 which has the integrally formed extension 12 extending from the rear end portion of the part 15 so that the extension 12 is brought in contact with a top of the lead-screw shaft 2. The connecting portion 13, which is formed on the bottom of the extension 12, is fitted in the thread groove 2a of the lead-screw shaft 2 so as to move the head carriage 30 in the axial direction of the lead-screw shaft 2 when the lead-screw shaft 2 is rotated. Thus, when the lead-screw shaft 2 is rotated, a drive force is exerted from the thread ridge 2b of the lead-screw shaft 2 onto the connecting portion 13 of the head carriage 30 in a direction perpendicular to the flank surface of the lead-screw shaft 2.

The carriage body 15 includes a lower surface 15a which is substantially at the same height as the lowermost point of the outer peripheral surface of the lead-screw shaft 2 when the connecting portion 13 is fitted in the thread groove 2a of the lead-screw shaft 2. The leaf spring 31 includes a fixed end portion 31a and a free end portion 31b. The fixed end portion 31a is fixed onto the lower surface 15a of the carriage body 15 by means of machine screws 34 via a washer 33. The other end portion of the leaf spring 31, which is the free end portion 31b, includes a horizontal part 31c extending along the horizontal line of the lower surface 15a, a contact part 31d extending slantwise from the end of the horizontal part 31c, and a guide part 31e provided at the leading edge of the leaf spring 31 for guiding the lead-screw shaft 2 when it is mounted in the head carriage 30. As shown in FIG. 6, the leaf spring 31 is bent at a position below the lead-screw shaft 2 and the contact part 31d of the leaf spring 31 extends from the horizontal part 31c upwardly slantwise at about 45 deg. to the horizontal part 31c.

Figure 1:
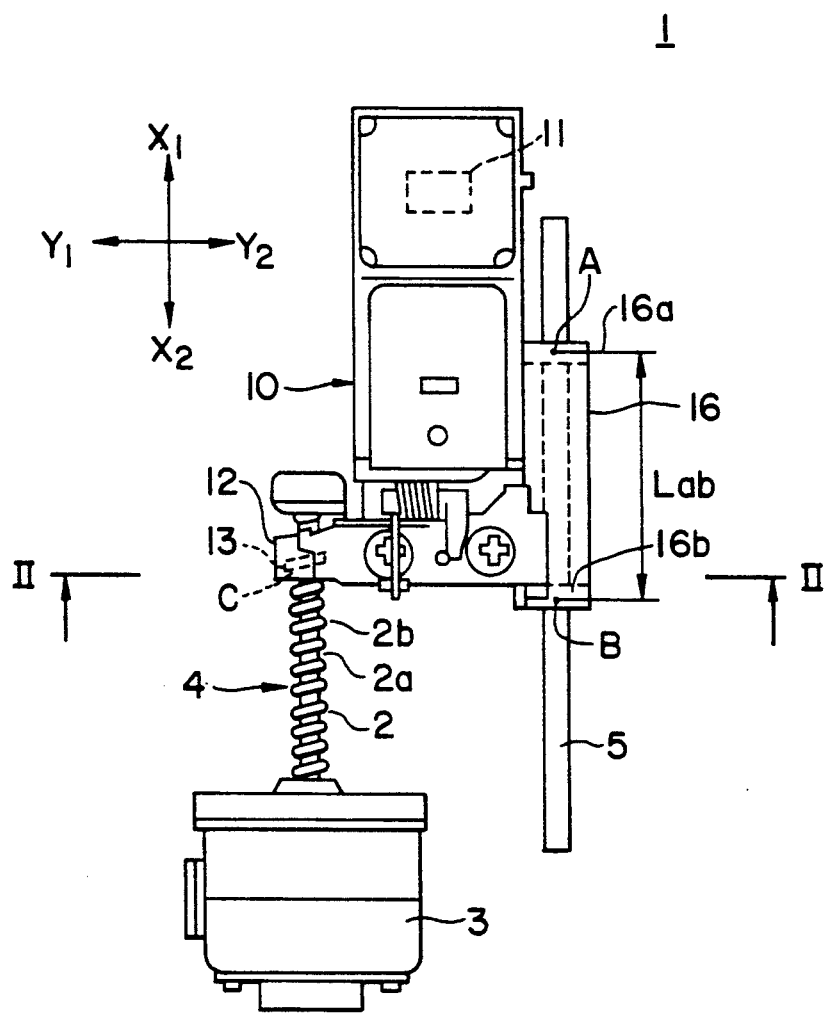
FIG. 1 is a plan view showing a conventional head carriage apparatus employing a lead screw shaft.

Similar to the apparatus shown in FIG. 1, the guide portion 32 has two supporting portions 32a and 32b at which the head carriage 30 is supported so that the movement of the head carriage 30 in the axial direction of the lead-screw shaft 2 is guided by the guide shaft 5 inserted into the guide portion 32. However, in order to downsize the disk drive unit, the supporting portion 32b of the guide portion 32 is changed or displaced in forward direction to the position as shown in FIG. 3B. Thus, the supporting point B at which the guide shaft 5 is connected to the supporting portion 32b is located on the same side as the supporting point A, corresponding to the supporting portion 32a, with respect to the perpendicular line D.

Figure 7:
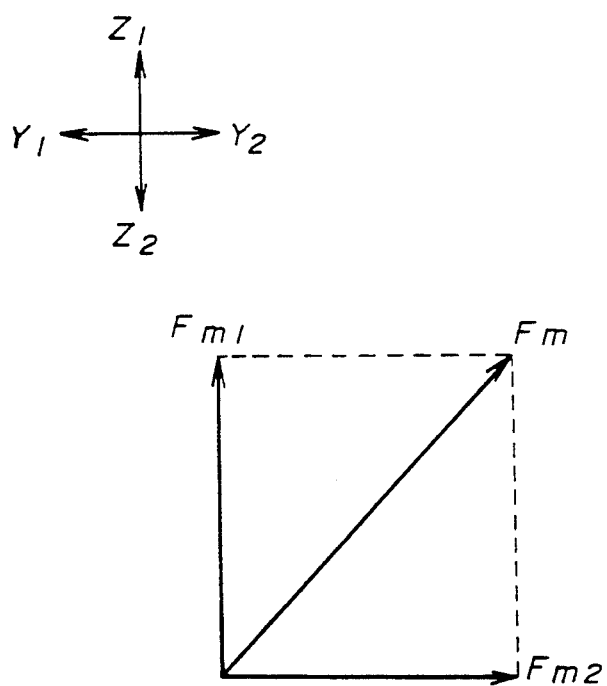
FIG. 7 is a diagram for explaining the effect of a force exerted by a leaf spring on the head carriage apparatus of the invention shown in FIG. 6.

The free end portion 31b of the leaf spring 31 is brought in contact with the outer peripheral surface of the lead-screw shaft 2 at a contact point G, and the horizontal part 31c and the contact part 31d of the free end portion 31b are resiliently deflected downwardly. Owing to the resilient force by the leaf spring 31, an upward, slanting force Fm is exerted from the contact part 31d of the leaf spring 31 onto the lead-screw shaft 2 at the contact point G. FIG. 7 shows this force Fm on the lead-screw shaft 2 in the slanting direction to the horizontal line of the lower surface 15a, and the force Fm is decomposed into a component force Fml in the vertical direction, as indicated by an arrow Z1 in FIG. 6, and a component force Fm2 in the horizontal direction, as indicated by an arrow Y2 in FIG. 6. This component force Fml has the same effect as in the conventional apparatus, that is, the thread groove 2a of the lead-screw shaft 2 is pressed upwardly by the leaf spring 31 against the connecting portion 13 of the extension 12 in the vertical direction, as indicated by the arrow Z1 in FIG. 6, thus preventing the connecting portion 13 from being easily separated from the thread groove 2a of the lead-screw shaft 2.

The lead-screw shaft 2 is pressed by the component force Fm2 of the force Fm which is facing the head carriage 30. Owing to the reaction to the component force Fm2, the head carriage 30 is moved in the direction as indicated by the arrow Y1 in FIG. 6. With respect to the axial direction of the lead-screw shaft 2, the leaf spring 31 and the connecting portion 13 are aligned, and the reaction force Fm2 acts at the supporting point C in the direction as indicated by the arrow Y1.

Figure 8:
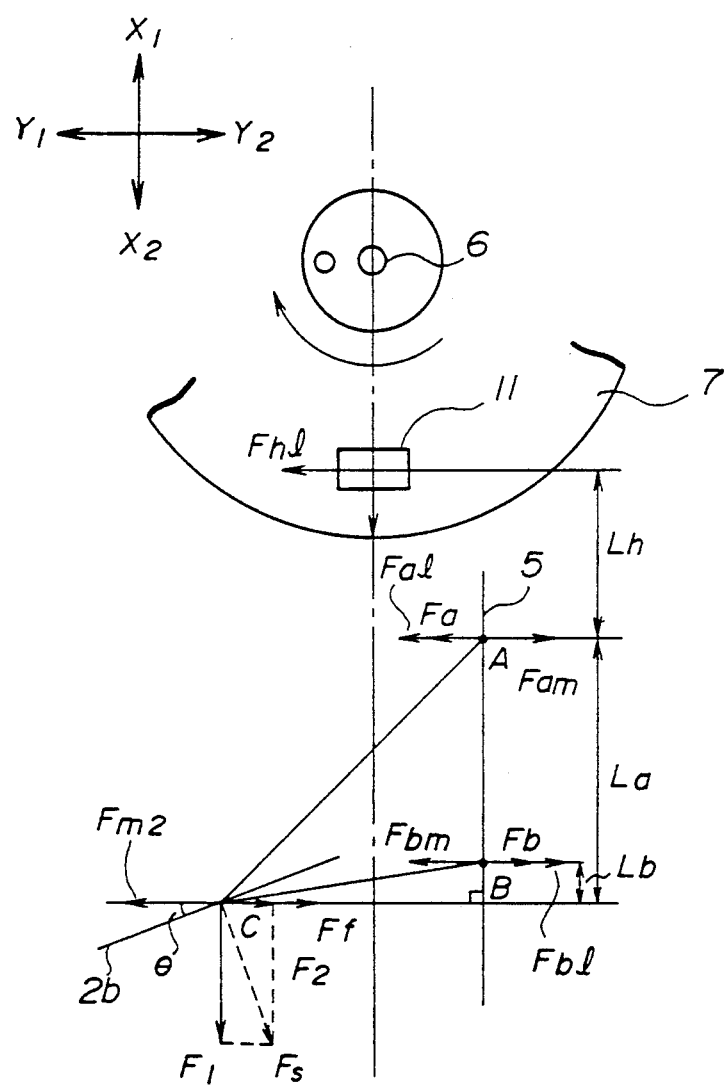
FIG. 8 is a diagram for explaining the effects of forces acting on the head carriage apparatus of the invention when the head carriage is moving away from a fixed spindle shaft around which a disk is rotated.

FIG. 8 shows schematically forces acting on the head carriage apparatus 20 at the supporting points A, B and C, when the head carriage 30 is moving away from the fixed shaft 6 around which the disk is rotated. This movement of the head carriage is called a step-out mode. In FIG. 8, in addition to the forces which are the same as those corresponding forces acting on the conventional head carriage 10 shown in FIG. 4, the above force Fm2 by the leaf spring 31 acts on the head carriage 30 at the supporting point C in the direction Y1. Due to this force Fm2, a pair of forces Fam and Fbm act on the head carriage 30, the force Fam acting at the supporting point A in the direction Y2 and the force Fbm acting at the supporting point B in the direction Y1. These force Fam and Fbm counteract, respectively, the above mentioned forces (Fa+Fal) and (Fb+Fbl) acting in the opposite directions. More specifically, the force Fam counteracts the force (Fa+Fal) acting at the supporting point A in the direction Y1, and the force Fbm counteracts the force (Fb+Fbl) acting at the supporting point B in the direction Y2.

Therefore, the rotating force to rotate the head carriage 10, due to the forces (Fa+Fal) and the (Fb+Fbl) in the conventional apparatus, can be reduced remarkably by the force Fm2 produced by the leaf spring 31 of the head carriage apparatus according to the present invention. Hence, the head carriage according to the present invention is not rotated around the axis perpendicular to the horizontal plane of the head carriage, and it is possible that the movement of the head carriage 30 is stabilized and the head 11 is placed onto the disk 7 at proper position in accurate direction.

Figure 9:
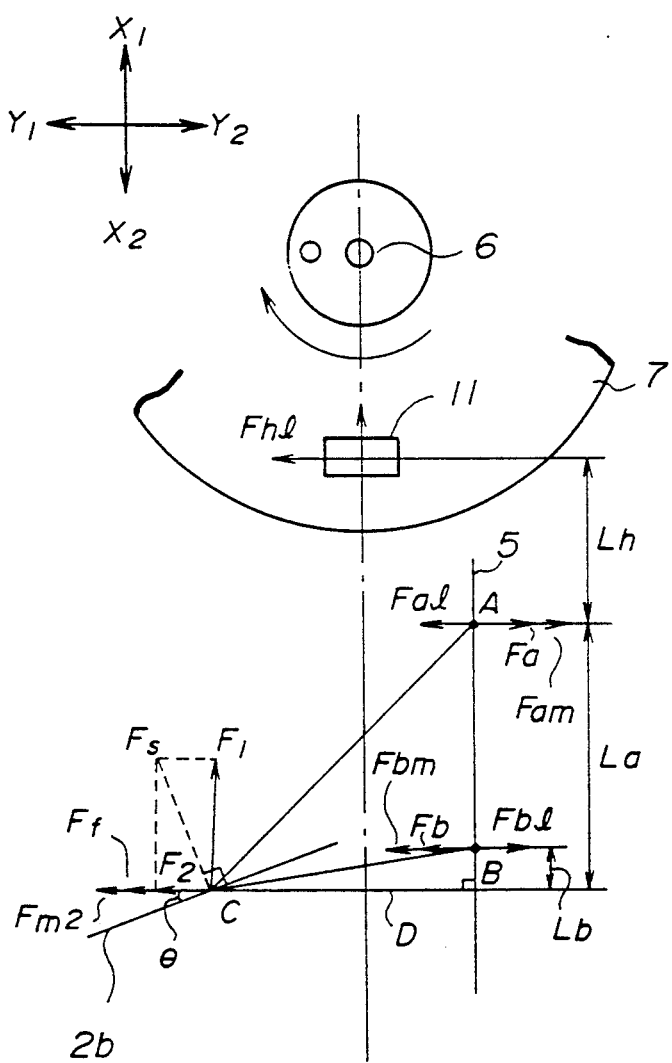
FIG. 9 is a diagram for explaining the effects of forces acting on the head carriage apparatus of the invention when the head carriage is approaching the spindle shaft around which the disk is rotated.

FIG. 9 shows schematically forces acting on the head carriage 30 at the supporting points A, B and C when the head carriage 30 is approaching the fixed shaft 6. This movement of the head carriage 30 is called a step-in mode. In this step-in mode, the forces Fa and Fb act at the supporting points A and B in the directions Y2 and Y1, which are opposite to the corresponding directions in the step-out mode described above. Due to the force Fm2 produced by the leaf spring 31, the force Fam acts at the supporting point A in the direction Y2, which direction is the same as the direction of the force Fa, and the force Fbm acts at the supporting point B in the direction Y1, which direction is the same as the direction of the force Fb. However, in general, the forces Fal and Fbl due to the head load force Fhl are greater than the forces Fa and Fb. Hence, the combined force (Fa+Fam) acting at the supporting point A in the direction Y2 counteracts the force Fal, and the combined force (Fb+Fbm) acting at the supporting point B in the direction Y1 counteracts the force Fbl. Therefore, the rotating force to rotate the head carriage 30 around the axis perpendicular to the horizontal plane of the head carriage can be reduced from that in the conventional apparatus, and it is possible that the movement of the head carriage 30 is stabilized and the head 11 is placed onto the disk 7 at proper position in accurate direction.

As described above, the directions of the forces Fa and Fb in the step-out mode are inverted to the opposite directions in the step-in mode. Although it is impossible to completely eliminate the above described rotating force to rotate the head carriage 3 around the vertical axis both in the step-in mode and in the step-out mode, the rotating force on the head carriage 30 can be attenuated or lowered to a small level suitable for both the step-in mode and the step-out mode. Therefore, it is possible to achieve stable movement of the head carriage in accurate direction so that the disk drive unit performs correctly recording and reproducing information on the disk, when the supporting point of the guide portion is changed in forward direction into the position as shown in FIG. 3B in order to downsize the disk drive unit.

In addition, because the rotating force to rotate the head carriage 30 is reduced to a small level, forces acting on the guide shaft at the supporting points A and B in sidewise directions are also reduced so that the head carriage 30 can be smoothly moved, thus achieving accurate movement of the head carriage 30.

Figure 10:
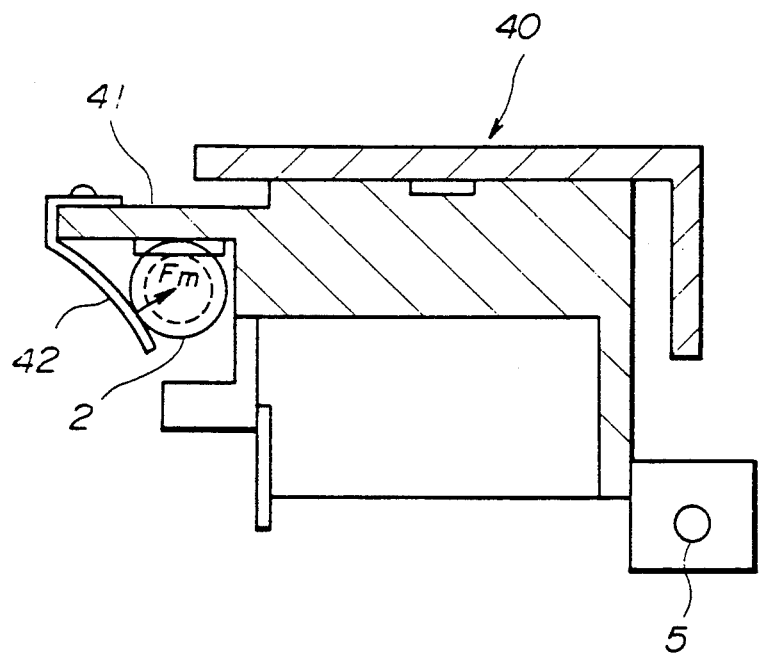
FIG. 10 is a sectional view showing a modification of the head carriage apparatus to which the present invention may be applied.

According to the present invention, the resilient part of the head carriage apparatus may be formed into two leaf springs, one of them being the above leaf spring 14 pressing the lead-screw shaft 2 against the extension 12 in the direction Z1 as shown in FIG. 2, and the other being a separate leaf spring pressing the lead-screw shaft 2 in the direction Y2 facing the carriage body 15. Also, a modification of the head carriage apparatus may be made according to the present invention. FIG. 10 shows a modified head carriage apparatus of the present invention. In FIG. 10, a head carriage apparatus 40 includes an extension 41 on which a leaf spring 42 is provided with a fixed end portion fixed at an edge portion on top of the extension 41, and a free end portion extending externally from the edge portion of the extension 41 in a downward, slanting direction so that the lead-screw shaft 2 is pressed, in an appropriate direction facing the head carriage 40, by a pressing force Fm exerted by the leaf spring 42. This modified head carriage apparatus can achieve the same effect as that of the apparatus shown in FIG. 6.

Further, the present invention is not limited to the above described embodiments, and variations and modifications may be made without departing from the scope of the present invention.

What is claimed is:

1. A head carriage apparatus comprising: a head carriage including a head which is placed onto a disk for recording and reproducing information on the disk, said head carriage including an extension extending eternally from an end portion of said head carriage and a connecting portion formed on said extension integrally with said head carriage;

a lead-screw shaft coupled to said head carriage and having a lead screw in which a thread ridge and a thread groove are formed, said connecting portion being fitted in the thread groove of the lead screw;

drive means for driving and rotating said lead-screw shaft, said head carriage being moved in a radial direction of the disk, parallel to an axial direction of said lead-screw shaft, by rotation of said lead-screw shaft rotated by said drive means;

resilient means for pressing the lead-screw shaft in a slanting direction toward the head carriage, a force acting on the lead-screw shaft in said slanting direction due to said resilient means having a first component force perpendicular to the axial direction of the lead-screw shaft in which the head carriage is moved acting to press the lead-screw shaft in a horizontal direction toward the head carriage and a second component force perpendicular to the axial direction of the lead-screw shaft in which the head carriage is moved acting to press the lead-screw shaft onto said head carriage in an upward vertical direction, said resilient means being fixed at one end onto said head carriage, and the other end of said resilient means being brought into contact with an outer peripheral surface of said lead-screw shaft at a position which corresponds, with respect to the axial direction of the lead-screw shaft, to a first position at which the connecting portion of the head carriage is fitted in the thread groove of the lead-screw shaft; and a guide portion, into which a guide shaft is inserted, provided on a side of said head carriage opposite to said extension for guiding said movement of said head carriage in a direction parallel to the radial direction of the disk, said head carriage being supported by said guide shaft at first and second supporting positions of the guide portion which are located apart from each other in the axial direction of the guide shaft, said first and second supporting positions being located on the same side with respect to a perpendicular line passing through said connecting portion and being perpendicular to the axial direction of the guide shaft, said first and second positions being completely spaced from said perpendicular line.

2. The apparatus as claimed in claim 1, wherein said head carriage has a lower surface which is located substantially at the same height as a lower-most point of the outer peripheral surface of the lead-screw shaft when the connecting portion is fitted in the thread groove of the lead-screw shaft.

3. The apparatus as claimed in claim 1, wherein said resilient means is a leaf spring having a fixed end part fixed on a lower surface of the head carriage, a flat part extending horizontally along a horizontal line of the lower surface of the head carriage, a contact part extending upwardly and slantwise from said flat part, a guide part extending from the contact part and provided at a leading edge of said resilient means for guiding the lead-screw shaft when it is mounted in the head carriage, said leaf spring being bent at a position between the flat part and the contact part, below said lead-screw shaft, which corresponds to the first position at which the connecting portion is fitted in the thread groove.

4. The apparatus as claimed in claim 1, wherein said resilient means is a leaf spring which is provided on the extension and extends externally from an edge portion of the extension to an outer peripheral surface of the lead-screw shaft provided on bottom of the extension in a downward slanting direction so that the lead-screw shaft is pressed by said leaf spring appropriately in a direction facing the head carriage.

* * * * *